3,384,572
CATALYTIC HYDROCRACKING
Claude G. Myers, Pitman, Barton W. Rope, Mullica Hill, and William E. Garwood, Haddonfield, N.J., assignors to Mobil Oil Corporation, a corporation of New York
No Drawing. Filed Aug. 3, 1964, Ser. No. 387,201
6 Claims. (Cl. 208—111)

This invention is directed toward a novel process for the catalytic hydrocracking of hydrocarbons in order to produce lower molecular weight hydrocarbons, and more particularly, to a novel hydrocracking process which has as its primary objective the attainment of the maximum liquid yield of lower molecular weight products from any given charge stock.

The catalytic hydrocracking of hydrocarbons to produce lower boiling hydrocarbons and in particular hydrocarbons boiling in the motor fuel range, is an operation upon which a vast amount of time and effort has been spent in view of its commercial significance. Hydrocracking operations have heretofore been proposed in which there is employed a catalyst comprising one or more components exhibiting hydrogenation activity such as the metals of Group VI and Group VIII of the Periodic Table either in elemental form or in the form of the oxides or sulfides thereof. Such components have been deposited by impregnation on various supports such as those of alumina, silica, and combinations thereof, e.g. silica-alumina, silica-magnesia, silica-zirconia, silica-boria, silica-titania, etc. While such type of catalyst has proved to be fairly satisfactory, it is subject to improvement, particularly in regard to its ability to afford a high yield of useful liquid product with a concomitant small yield of undesirable products.

Commercial catalytic hydrocracking has been carried out by contacting a hydrocarbon charge in the vapor or liquid state in the presence of hydrogen with a catalyst of the above-indicated type under conditions of temperature, pressure and time to achieve substantial conversion of the charge to lower boiling hydrocarbons. Such hydrocarbon processes can be carried out in a fixed bed of catalyst wherein the hydrocarbon feed is passed over the catalyst under processing conditions wherein little attrition of the catalyst can occur. On the other hand, hydrocracking processes can be advantageously carried out employing methods wherein the catalyst is subjected to continuous handling. In these operations a continuously moving stream of hydrocarbon feed is contacted with a continuously moving stream of catalyst for accomplishment of conversion and thereafter the catalyst is regenerated. The continuous handling and regeneration of catalyst particles results in considerable breakage and constant abrasion which can consume the catalyst. It is therefore desirable to utilize a hard porous catalyst having the ability to withstand abrasion during the necessary handling involved during the conversion and regeneration processes.

During the hydrocracking conversion of high boiling hydrocarbons to lower boiling hydrocarbons a carbonaceous deposit is laid down on the catalyst commonly called "coke." A deposition of coke tends to seriously impair the catalytic efficiency of the catalyst for the conversion reaction and this reaction is thereafter suspended after coke, to the extent of a few percent by weight, has accumulated on the catalyst. The catalytic surface is then regenerated by removal of the coke in a stream of regenerating gas.

As is known, coke and other undesired products are formed at the expense of useful products such as gasoline. It is obvious that during the period of regeneration the catalyst is not being effectively employed for conversion purposes. It, accordingly, is highly desirable not only to afford a large overall conversion of the hydrocarbon charge, i.e. to provide a catalyst of high activity, but also to afford an enhanced yield of useful products such as gasoline, while maintaining undesired products such as coke at a minimum. The ability of hydrocracking conversion catalysts to control or to direct the course of conversion is referred to as selectivity. Thus, an exceedingly useful and widely sought characteristic in a hydrocracking catalyst is high selectivity.

Attempts have heretofore been made to provide an extremely active and selective catalyst so that the desired hydrocracking conversion of hydrocarbon fractions could be continued for extended periods of time without substantial coke formation taking place. However, the vast majority of these heretofore proposed processes utilized specific types of hydrocarbon fractions as feeds and other hydrocarbon fractions, not possessing desired characteristics, were generally subjected to pretreatment, such as refining, so as to reduce the more prominent coke producing or otherwise deleterious components. In any event, additional and expensive operation steps are utilized in a hydrocracking process to limit coke accumulation on the catalyst. It is desired, therefore, to overcome these existing significant problems by providing a catalyst composition which will produce the maximum yield of liquid products from any given hydrocarbon charge without resorting to expensive and time-consuming pretreatment steps.

Additionally, the heretofore proposed hydrocracking process in reality represented a compromise between maximum productivity and maximum selectivity and this compromise was reflected not only in the fact that that specific types of hydrocarbon fractions were employed as feed materials but also due to the fact that certain undesirable products, i.e., dry gas and coke, were produced at the expense of desirable liquid products, i.e., gasoline and fuel oil. Accordingly, it is highly desirable to arrive at a catalyst composition which would produce the maximum amount of lower molecular weight liquid products from a given hydrocarbon feed. It should be immediately evident that many situations exist wherein the refinery is limited as to what type of feed material is available and a process which can maximize the amount of liquid products from any given feed stock would be highly desirable.

In accordance with the present invention there is provided an improved hyydrocracking process utilizing a hydrocracking catalyst characterized by high resistance to attrition, high activity, exceptional selectivity and capable of producing the maximum amount of liquid products from a given hydrocarbon fraction, said catalyst being composed of a component exhibiting hydrogenation activity and a composite comprising a finely divided crystalline aluminosilicate having a certain minimum activity, as will be hereinafter described, and maintaining a carefully controlled balance between the activity of the aluminosilicate and the hydrogenation activity of the component in relation to the specific hydrocarbon fraction desired to be cracked.

The present invention is based on utilizing certain crystalline aluminosilicates which possess extremely high activity, i.e., can have activities as high as many thousands of times the activity of the best siliceous catalysts heretofore proposed, and maintaining a balance between the activity of the cracking components and the strength of the hydrogenation component in regard to the particular fraction which is being cracked.

It should be immediately understood that the mechanism involved in a hydrocracking reaction is extremely complex and is not completely understood in spite of the vast amount of time and effort spent in attempting to master it. However, it is known that, aside from the obvious scission of carbon atoms to produce compounds of lower molecular weight, the reactions which accompany a cracking operation include the formation of a smaller paraffin and an olefin from a larger paraffin; the formation of two olefins from a hydroaromatic compound; the formation of two small olefins from a larger olefin; the formation of hydroaromatics and hydrogen from paraffins; the reaction between a hydroaromatic compound and an olefin to produce an aromatic compound and a paraffin; saturation of olefins to produce paraffins via a hydrogen transfer reaction; olefin isomerization; paraffin isomerization; cycloolefin isomerization; cycloparaffin isomerization; rearrangement of alkyl groups and aromatics; redistribution of alkyl groups between two aromatics; dehydrogenation of paraffins to olefins; dehydrogenation of naphthenes to olefins; cyclization of olefins to naphthenes; dehydrocyclization of paraffins to naphthenes; dealkylation of alkyl aromatic compounds; hydrogen transfer reactions; hydrogenation of all types of unsaturated species, etc.

From the foregoing it can easily be seen that some reactions which accompany a commercial hydrocracking operation tend to maximize liquid products which are highly desirable while other reactions yield products which are less desirable and can easily lead to the formation of coke and gases. Therefore, the attempt to find an "ideal" catalyst from a chemical point of view presents many complicated theoretical problems.

However, it should be apparent that since a hydrocracking catalyst is composed of a hydrogenation-dehydrogenation component admixed with a cracking component, each of the components of the hydrocracking catalyst exercise a relative strength in relationship to the charge which is being cracked. Thus, for example, it is possible to formulate hydrocracking catalysts having different ratios of cracking activity to dehydrogenation activity. It is also obvious that the wide variety of competing reactions which accompany a hydrocracking reaction are to a certain extent governed by the particular nature of the hydrocarbon feed. Thus, for example, if a hydrocarbon feed is more paraffinic than another, certain reactions will take place to either a greater or lesser extent than if the feed were composed of primarily aromatic constituents.

Accordingly, the principal objective of this invention is to maximize the amount of liquid products which are obtainable from a given hydrocarbon charge by adjusting the relative strengths of the cracking *activity* and the hydrogenation-dehydrogenation *activity* of the catalyst in relation to the chemical composition of the particular feed which is being employed and to the chemical composition of the products desired. Moreover, the hydrogenation- dehydrogenation activity of a catalyst is a function not only of the chemical nature and concentration of the hydrogenation-dehydrogenation component of the catalyst (e.g., platinum (cobalt-molybdenum sulfides) but also of the reaction conditions (e.g. total pressure, hydrogen partial pressure, temperature). The cracking activity of a catalyst, on the other hand, depends very strongly on the concentration and chemical nature of the cracking component and only to a lesser degree on reaction conditions. In addition, the hydrocracking reaction is generally conceded to involve the consecutive reactions (1) hydrogenation and/or dehydrogenation on hydrogenation-dehydrogenation sites of the catalyst followed by (2) cracking of the products of that hydrogenation and/or dehydrogenation on the acid cracking sites of the catalyst. Therefore, either hydrogenation-dehydrogenation activity or cracking activity can be rate controlling with given reaction conditions and feed stock, and the relative strengths of hydrogenation-dehydrogenation activity and cracking activity giving highest yield of desired liquid products may be different in these two different cases.

If a hydrocracking operation were to be conducted so that the cracking sites were rate controlling, such a situation might or might not be desirable, depending on the chemical composition of the particular feed stock. In such an operation the hydrogenation-dehydrogenation activity would be great enough to supply more primary hydrogenated and/or dehydrogenated intermediates (e.g., olefins, diolefins or their corresponding carbonium ions, hereinafter referred to as "olefins") to the cracking sites per unit time than those cracking sites would be able to crack per unit time. Additionally, substantially all the aromatic rings in the feed stock will be hydrogenated because this reaction is highly favorable thermodynamically at conventional hydrocracking temperatures and pressures. Thus, if a feed stock were to be employed which was highly aromatic in character, it would be extremely undesirable to hydrogenate all the aromatic rings, since the desired liquid products are aromatically gasolines, in view of the fact that these gasolines have relatively high octane numbers and are economically valuable. Therefore, with an aromatic feed it would be desirable to preserve one aromatic ring per molecule being converted to gasoline through the hydrocracking step, and this cannot be effectively accomplished when the cracking sites are rate controlling.

On the other hand, if the feed stock was primarily paraffinic in character there would be no need to preserve aromatic rings since there would not be that many present in the feed. Additionally, the object would not be to produce aromatic gasolines since it is practically impossible to produce aromatic gasolines from a paraffin charge stock. Maximum utilization of a paraffin charge would reside in cracking as many high molecular weight components as possible to products boiling in the motor fuel range and this can best be done by supplying as many intermediate olefins to the cracking sites as possible—a situation which exists when the reaction is cracking site rate controlled.

In like manner if a hydrocracking operation were to be carried out wherein the hydrogenation-dehydrogenation sites are rate controlling, i.e., when the hydrogenation-dehydrogenation activity is not great enough under the reaction conditions to supply primary hydrogenated and/or dehydrogenated intermediates to the cracking side at a rate as great as that at which the cracking sites can crack them, then such a situation might or might not be desirable—again depending on the chemical composition of the particular feed desired to be cracked. When the hydrogenation-dehydrogenation sites are rate controlling there exists the the possibility of making aromatic high octane number gasolines at conventional hydrocracking temperatures and pressures due to the fact that aromatic gasolines can be made from aromatic feed molecules over catalysts and under condition givening restricted hydrogenation. This possibility hardly exists when hydrogenation-dehydrogenation activity is high enough to make the cracking sites rate controlling due to the fact that aromatic rings will be hydrogenated, as has been previously discussed. Thus, taking naphthalene as an exemplary feed stock aromatic, the initial step in hydrocracking is partial hydrogenation of one ring as illustrated by the following reaction scheme:

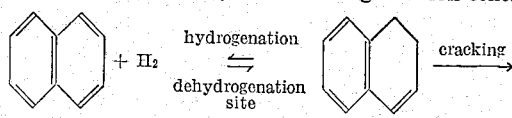

The resulting non-aromatic ring is subsequently cracked open at the catalyst cracking sites whereas the benzene ring is not due to the fact that it has remained unhydrogenated. Thus, to produce high octane number alkylbenzenes from polynuclear aromatics, hydrogenation activity must be so restricted that one aromatic ring remains unhydrogenated. Therefore, it can be seen that if a feed stock were to be employed which was primarily aromatic in character it would be extremely desirable to employ hydrocracking conditions such that the hydrogenation-dehydrogenation sites are rate controlling due to the fact that very valuable high octane aromatic gasolines can be made. On the other hand, if a feed stock were to be employed which was primarily paraffinic in character restricted hydrogenation-dehydrogenation activity would be extremely undesirable due to the fact that such conditions would not result in best utilization of the feed stock. As has previously been set forth, it is practically impossible to produce aromatic gasolines from a non-aromatic feed stock and, quite obviously, the problem of preserving aromatic rings becomes minimized due to the fact that there are very few present to preserve. In view of the fact that aromatic gasolines cannot be produced from a paraffinic feed stock, the objective in such a situation would be to produce the maximum amount of gasolines and this can best be accomplished if there is a sufficient supply of olefin intermediates to the cracking site. This situation cannot exist when the hydrogenation-dehydrogenation sites are rate controlling since restricted hydrogenation-dehydrogenation would occur and this does not supply the maximum amount of olefin intermediates.

Thus, it can be seen that an advantageous utilization of a feed stock which contained a high percentage of aromatic compounds would reside in that situation wherein a hydrocracking reaction was rate controlled by the hydrogenation-dehydrogenation sites and, conversely, the maximum utilization of a paraffinic feed stock would reside when the reaction was cracking site rate controlled.

Therefore, it can be seen that the novel process of this invention allows for a balance between the activity of the cracking component which is employed and the particular characteristics of the feed stock which is desired to be cracked.

From the above discussion, it is clear that a hydrocracking catalyst is not merely composed of the cracking component alone, but also includes a hydrogenation-dehydrogenation component and if one were merely to balance the cracking component with the particular characteristics of the charge stream, one would not arrive at a complete solution in maximizing the reaction to the maximum yield of liquid products. Thus, it is known that the hydrogenation-dehydrogenation activity of a particular component will vary over an extremely wide range, depending not only on the particular component itself, but also on the amount present in the reaction zone. For example, it is generally known that platinum has a greater dehydrogenation activity than cobalt-molybdenum, when compared under standard conditions of use. It should also be understood that the function of the dehydrogenation-hydrogenation component will also vary depending on the particular characteristic of the feed stream which is desired to be hydrocracked, as has previously been discussed.

As has heretofore been pointed out, the cracking component of the novel process of this invention comprises certain crystalline aluminosilicates which have unusually high catalytic activity as determined by comparison with a minimum activity value which is designated as alpha.

The alpha value of an aluminosilicate is defined as the relative activity of the particular material to that of a reference silica-alumina, having an activity index of 46 AI, for the cracking of normal hexane. The relative activity of a catalyst for the conversion of normal hexane is determined by continuously passing helium saturated with normal hexane over 1.5 cc. of the candidate catalyst utilizing a space velocity (LHSV) of approximately 0.5. The relative activity, a parameter derived as alpha, is then based on the approximate ratio of first order rate constants for the conversion of normal hexane to cracked products over a given catalyst to that of silica-alumina (46 AI) at 1000° F. For highly active catalysts the rate constant is determined at a reduced temperature and then calculated from an extrapolated value of the rate constant at 1000° F.

The 46 AI silica-alumina conventional catalyst, assigned an alpha of 1.0 will give 13.0 percent conversion of normal hexane, at 1000° F., using 1.5 cc. of catalyst, 30–60 mesh, with a gaseous flow rate of 10 cc./minute of helium saturated with N-hexane vapors at room temperature and pressure, instantaneous conversion being measured at the 5th minute of on-stream time.

The alpha value of various aluminosilicates are shown below.

| Aluminosilicate: | Alpha |
|---|---|
| Natural mordenite | 0.1 |
| Sodium zeolite A | 0.2 |
| Sodium zeolite X | 0.9–1.2 |
| Silica-alumina | 1.0 |
| Hydrogen-zeolite Y | 400–600 |
| Hydrogen-mordenite (natural) | 7,500 |
| Hydrogen-mordenite (synthetic) | 3,500–15,000 |
| Hydrogen-lanthanum zeolite X | 8,000–15,000 |
| Hydrogen zeolite Y | 10,000–30,000 |
| Calcium zeolite X | 1.6 |
| Hydrogen-zeolite T | 26,000 |
| Sodium zeolite Y | 1.1 |
| Potassium zeolite X | 0.7 |
| Calcium zeolite T | 0.4 |
| Hydrogen zeolite A | 0.5 |
| Hydrogen-rare earth zeolite X | 7,800 |
| Hydrogen-rare earth zeolite Y | 460 |
| Hydrogen-calcium zeolite X | 3.7–15 |
| Hydrogen-cerium zeolite X | 70,000 |
| Sodium-calcium zeolite A | 0.4 |
| Magnesium-zeolite X | 0.4 |
| Aluminum zeolite Y | 20,000 |
| Cobalt zeolite X | 3.4 |
| Steamed hydrogen-rare earth zeolite X | 5–15 |
| Steamed hydrogen-rare earth zeolite Y | 3–10 |
| Platinum impregnated rare earth zeolite Y | 13,000 |
| Hydrogen-zeolite ZK–5 | 440 |
| Hydrogen offretite | 30,000 |
| Iron-sodium zeolite X | 1.4 |
| Silver-calcium zeolite X | 4.7 |
| Silver-calcium zeolite A | 5.4 |
| Nickel-zeolite X | 17.0 |

The aluminosilicates which can be admixed with the component exhibiting hydrogenation activity for use in the process of the instant invention have crystalline structure and possess at least 0.5, and preferably 0.8 to 1.0, equivalents of ions of positive valence per gram atom of aluminum. The alumino-silicates can be described as a three-dimensional framework of $SiO_4$ and $AlO_4$ tetrahedra in which the tetrahedra are cross-linked by the sharing of oxygen atoms, whereby the ratio of total aluminum and silicon atoms to oxygen atoms is 1 to 2. In their hydrated form the aluminosilicates may be represented by the following formula:

$$M_{2/n}O:Al_2O_3:wSiO_2yH_2O$$

wherein M represents at least one ion of positive valence which balances the electrovalence of the tetrahedra and represents the valence of the ion; $w$, the moles of $SiO_2$; and $y$ the moles of $H_2O$. The ions of positive valence can be any or more of a number of metal ions, hydrogen ions, ammonium ions, depending upon whether the aluminosilicate is synthesized or occurred naturally.

Aluminosilicates which can be employed include synthesized aluminosilicates, natural aluminosilicates and certain caustic treated clays. Among the preferred aluminosilicates one can include zeolites A, Y, L, D, R, S, T, Z, E, M, Q, B, X, analcite, paulingite, nosilite, phillipsite, brewsterite, flakite, datolite, chabazite, gmelinite, leucite, scapolite, mordenite, as well as certain caustic treated clays such as those of the montmorillonite and kaolin families. The particularly preferred aluminosilicates are those having pore diameters of at least 6 Angstrom units.

Although the commercially available aluminosilicates are sold either in the alkali metal or alkaline earth metal forms, it is to be understood that this invention encompasses the use of aluminosilicates wherein the cation can be other than alkaline earth metals or alkali metals. Representative cations which can be attached to the aluminosilicates would include silver, calcium, beryllium, barium, magnesium, manganese, zinc, aluminum, titanium, nickel, chromium, iron, lanthanum, neodymium, cobalt, smarium, europium, gadolinium, terbium, dyspromium, holmium, erbium, thulium, yttrium, lutetium, scandium, as well as hydrogen, ammonium and mixtures of the above.

Aluminosilicates containing any desired cation with a metallic acid ammonium or mixtures thereof can be conveniently prepared by treating an aluminosilicate with a fluid medium containing the desired cation or cations. In carrying out the treatment with the fluid medium for example an aqueous solution, the procedure employed comprises contacting the aluminosilicate with the desired fluid medium until such time as at least some of the metallic cations originally present are replaced. Elevated temperatures tend to hasten the speed of treatment whereas the duration thereof varies inversely with the concentration of the ions in the fluid medium. In general, the temperatures employed range from below ambient room temperature of about 24° C. up to temperatures below the decomposition temperature of the aluminosilicate. Following the fluid treatment the treated aluminosilicate is washed with water, preferably distilled water, until the effluent wash water has a pH of between about 5 and 8. The resulting product can thereafter be analyzed for ion content by methods well known in the art such as desired. Analysis would also involve anlyzing the effluent wash for anions obtained in the wash as a result of the treatment as well as determination of, and correction for, anions that pass into the effluent wash from soluble substances or the decomposition products of soluble substances which are otherwise present in the aluminosilicate as impurities.

The actual procedure employed for carrying out the fluid treatment of the aluminosilicate may be accomplished in a batchwise or continuous method under atmospheric, subatmospheric or superatmospheric pressures. A solution containing the desired ion or ions in the form of an aqueous or nonaqueous solution may be passed slowly through a fixed bed of an aluminosilicate. If desired hydrothermal treatment or a corresponding non-aqueous treatment with polar solvents may be effected by introducing the aluminosilicate and fluid medium in a closed vessel maintained under autogenous pressure.

As has heretofore been set forth, one of the essential elements of the novel process of this invention resides in balancing the activity of the cracking component with the particular characteristics of the charge stock which is to be cracked. In this connection it should be noted that another advantage of the novel process of this invention resides in diluting the activity of a particular cracking catalyst if, in fact, its activity is ascertained to be too high for a particular charge stock. For example, if a particular hydrocarbon fraction necessitated an aluminosilicate having an activity of 10 alpha, such a material could be obtained in a number of ways. Obviously an aluminosilicate could be formulated which did, in fact, possess an activity of 10 alpha, or, even more preferably, an aluminosilicate could be chosen which had a higher alpha and the activity reduced to the desired quantity. Thus, for example, if an aluminosilicate had an activity of 100 alpha, it could be combined with a porous matrix which had very little activity of its own in comparison to the activity of the aluminosilicate, until such time as the activity of the entire composite had the desired value. It can be seen, for example, that if 10 parts by weight of an aluminosilicate having an activity of 100 alpha were combined with 90 parts by weight of a porous matrix which had substantially little activity, the activity of the resulting composite would be 10 alpha. One particular advantage which is gained from using an aluminosilicate having a high alpha and reducing it by combining it with a porous matrix, is due to the fact that the resulting cracking component of the catalyst has greater mechanical strength and is less subjected to attrition losses in commercial hydrocrackers.

The term "porous matrix" includes inorganic and organic compositions with which the aluminosilicates can be combined, dispersed, or otherwise intimately admixed when the matrix can be active or more preferably relatively inactive. It is to be understood that the porosity of the compositions employed as a matrix can either be inherent in the particular material or can be introduced by mechanical or chemical means. Representative matrices which can be employed include metals and alloys thereof, sintered metals and sintered glass, asbestos, silicon carbide aggregates, pumice, firebrick, diatomaceous earth, activated charcoal, organic resins such as polyepoxides, polyamides, poly esters, vinyl esters, phenolics, amino resins, melamines, acrylics, alkyds, epoxy resins and inorganic oxides. Of these materials the inorganic oxide gels are particularly preferred because of their superior porosity, attrition resistance, and stability under reaction conditions.

The compositions containing an inorganic oxide gel can be prepared by several methods wherein the aluminosilicates are reduced to a particle size less than 40 microns, preferably within the range of 1 to 10 microns, and intimately admixed with an inorganic oxide gel while the latter is in a hydrous state, such as in the form of a hydrosol, hydrogel, wet gelatinous precipitate, or mixture thereof. Thus, finely divided active aluminosilicates can be mixed directly with a siliceous gel formed by hydrolyzing a basic solution of alkali metal silicate with an acid such as hydrochloric, sulfuric, etc. The mixing of the components can be accomplished in any desired manner, such as in a ball mill or other types of kneading mills. The aluminosilicate may also be dispersed in a hydrosol obtained by reacting an alkali metal silicate with an acid or alkaline coagulant. The hydrosol is then permitted to set in a mass to a hydrogel which is thereafter dried and broken into pieces of desired shape or dried by conventional spray drying techniques and dispersed through a nozzle into a bath of oil or other water immiscible suspending medium, to obtain spheroidally shaped "bead" particles of a catalyst such as described in U.S. Patent 2,384,946. The aluminosilicate-siliceous gel thus obtained is washed free of soluble salts and thereafter dried and/or calcined as desired.

In a like manner, the aluminosilicates may be incorporated with an aluminiferous oxide. Such gels and hydrous oxides are well known in the art and may be prepared, for example, by adding ammonium hydroxide, ammonium carbonate, etc., to a salt of aluminum, such as aluminum chloride, aluminum sulfate, aluminum nitrate, etc., in an amount sufficient to form aluminum hydroxide which, upon drying, is converted to alumina. The aluminosilicate may be incorporated with the aluminiferous oxide while the latter is in the form of hydrosol, hydrogel, or wet gelatinous precipitate or hydrous oxide.

The inorganic oxide gel may also consist of a plural gel comprising a predominant amount of silica with one or more metals or oxides thereof selected from Groups IB, II, III, IV, V, VI, VII, and VIII of the Periodic Table. Particular preference is given to plural gels or silica with metal oxides of Groups IIA, III and IVA of the Periodic Table, especially wherein the metal oxide is rare earth oxide, magnesia, alumina, zirconia, titania, beryllia, thoria, boria, or combination thereof. The preparation of plural gels is well known and generally involves either separate precipitation or coprecipitation techniques, in which a suitable salt of the metal oxide is added to an alkali metal silicate and an acid or base, as required, is added to precipitate the corresponding oxide. The silica content of the siliceous gel matrix contemplated herein is generally within the range of 55 to 100 weight percent with the metal oxide content ranging from 0 to 45 percent.

The porous matrix may also consist of a semi-plastic or plastic clay material. The aluminosilicate can be incorporated into the clay simply by blending the two and fashioning the mixture into desired shapes. Suitable clays include attapulgite, kaolin, sepiolite, polygarskite, kaolinite, plastic ball clays, bentonite, montmorillonite, illite, chlorite, etc.

Other preferred matrices include powdered metals, such as aluminum, stainless steel, and powders of refractory oxides, such as alumina, etc., having very low internal pore volume. Preferably, these materials have substantially no inherent catalytic activity of their own.

The catalyst product can be precalcined in an inert atmosphere near the temperature contemplated for conversion but may be calcined initially during use in the conversion process. Generally, the catalyst is dried between 150° F. and 600° F. and thereafter calcined in air or an inert atmosphere of nitrogen, helium, flue gas or other inert gas at temperatures ranging from about 500° F. to 1500° F. for periods of time ranging from 1 to 48 hours or more. It is to be understood that the aluminosilicate can also be calcined prior to incorporation into the inorganic oxide gel.

It has been further found in accordance with the invention that catalysts of improved selectivity and having other beneficial properties are obtained by subjecting the catalyst product to a mild steam treatment carried out at elevated temperatures of 800° to 1500° F. and preferably at temperatures of about 1000° F. to 1400° F. The treatment may be accomplished in an atmosphere of 100% steam or in an atmosphere consisting of steam and a gas which is substantially inert to the aluminosilicate. The steam treatment apparently provides beneficial properties in the aluminosilicate compositions and can be conducted before, after or in place of the calcination treatment.

The hydrogenation-dehydrogenation component which is admixed with the crystalline aluminosilicate to arrive at the novel hydrocracking catalyst of this invention can include metals, oxides and sulfides of metals of the Periodic Table which fall in Group VIA, including chromium, molybdenum, tungsten and the like, and Group VIII including cobalt, nickel, platinum, palladium, rhodium, and the like, and combinations of metals, sulfides and oxides of metals of Groups VI and VIII such as nickel tungsten sulfide, cobalt oxide-molybdenum oxide and the like. The amount of hydrogenation component can range from about 0.1 to about 30 weight percent, based on the hydrocracking catalyst depending upon the dehydrogenation activity desired for a particular hydrocarbon fraction which is to be cracked.

The dehydrogenation-hydrogenation activity of various components which can be admixed with the crystalline aluminosilicates to arrive at the novel hydrocracking catalyst of this invention can be determined by various tests. One very common test for measuring the dehydrogenation activity (DA) of a catalyst would involve dehydrogenating cyclohexane and measuring the results obtained against a standard. This test is carried out by contacting 5.5 milligrams of the candidate dehydrogenation catalyst with 100 cc. of cyclohexane per hour at a pressure of 350 p.s.i.g., a molar ratio of hydrogen to hydrocarbon of 4.0, at a temperature of 750° F. and at a conversion level of from 0–7 percent. This test is described by C. G. Myers and G. W. Munns, Ind. Eng. Chem. 50, 1727 (1958), and also in the other reference given in col. 10. This test is suitable for conventional platinum catalyst having extremely high dehydrogenation activity in comparison with the other materials commonly used as dehydrogenation catalysts, but the above-described test does not give very accurate results for materials possessing low dehydrogenation activity. Accordingly, a different test was devised involving the hydrogenation of benzene in order to measure the relative activity of catalysts, particularly those possessing relatively low activities. In this test benzene is contacted with the candidate catalyst at a pressure of 1000 p.s.i.g. at a liquid hourly space velocity of 2.0, at a molar ratio of hydrogen to hydrocarbon of 10.0, at a temperature of 700° F. and a conversion level of 10 to 100. This test is described by C. G. Myers, W. E. Garwood, B. W. Rope, R. L. Wadlinger and W. P. Hawthorne, Journ. Chem. Eng. Data, 7, 257 (1962).

Results from the above-described test confirmed what has been generally known in the prior art in that the activity of platinum is far superior to that of other components. Thus, for example, the relative rates of activity in descending order would be platinum, nickel-tungsten sulfide and cobalt-molybdenum sulfides. It should be immediately understood, however, that the dehydrogenation activity of a particular material is to a certain extent directly proportional to the concentration in which it is present in a particular reaction zone. Thus, for example, even though platinum has a greater intrinsic activity than cobalt-molybdenum, a catalyst could be formulated which contained an insignificant amount of platinum and others could be formulated which contained a relatively high proportion of cobalt-molybdenum, such that the latter would have a greater dehydrogenation activity than the former.

In order to alleviate the obvious difficulties in arriving at relative hydrogenation-dehydrogenation activity due to the variation in the amount of hydrogenation component which can be added, the following test method is used for measuring activity in accordance with the novel process of this invention and, as can be seen, is independent of the concentration of the particular material in question. In this test method silica-alumina, having an activity index of 46 AI is impregnated with varying amounts of various components and the resulting composite is then evaluated for the hydrogenation of benzene at a pressure of 1000 p.s.i.g., a liquid hourly space velocity of 2.0, a molar ratio of hydrogen to hydrocarbon at 10.0, a temperature of 700° F. and a conversion level of 10 to 100, and the percent benzene hydrogenated is measured. The amount of benzene which is hydrogenated is then taken to be the exact numerical determination of the hydrogenation ability of the particular catalyst. Thus, quite obviously, the maximum amount of benzene that could be hydrogenated is 100 and if a catalyst would, in fact, hydrogenate 100% of benzene its activity would be equal to 100. If a particular catalyst would only hydrogenate 50% of the benzene, then its activity would be said to be 50. Therefore, as hereinafter used in the specification and claims, dehydrogenation-hydrogenation activity will be based on the results of the above-described test procedure.

As has heretofore been pointed out, the novel process of this invention resides in utilizing crystalline aluminosilicates in combination with a component exhibiting hydrogenation-dehydrogenation activity in a hydrocracking process and balancing the activity of the cracking component and the activity of the hydrogenation component in relation to any given hydrocarbon feed.

To determine the chemical nature of the feed stock in preparation for choosing catalyst hydrogenation-dehydrogenation activity and cracking activity various methods can be used. The most complete and satisfactory method would involve determination of hydrocarbon type analysis by mass spectrometry and analysis for non-hydrocarbon components S, O, and N by conventional methods. It is to be understood however, that there are methods other than analysis by mass spectrometer for estimation of the chemical nature of the hydrocracking fractions which also take into account aromaticity. A less complete but more rapid method, for example, depends on the use of the Watson characterization factor. This factor is defined by the following equation:

$$K = (T_b)^{1/3}/S$$

wherein K is the characterization factor, $T_b$ is the average boiling point in degrees Rankine and S equals the specific gravity at 60/60° F. In the Watson characterization factor, the specific gravity is a function both of boiling range and aromaticity, and the average boiling point is the indicator of boiling range alone. Therefore, for feed stocks of about the same boiling range, specific gravity itself is a fair indicator of aromaticity. Aniline point is another parameter which is a function of aromaticity, and aniline-gravity product is another parameter which is a function of both aromaticity and boiling range. Tabulated below are the values of various indicators of feed stock composition for three feed stocks and it can be seen that the Watson characterization factor is a fairly good measure of aromaticity.

TABLE

|  | 1 | 2 | 3 |
|---|---|---|---|
| Mid-boiling point, °F | 797 | 508 | 501 |
| Vol. Percent Aromatics (by Mass Spec.) | 37 | 68 | 60 |
| Aniline Point, °F | 190 | 58 | 65 |
| Gravity, °API | 26.2 | 18.7 | 20.8 |
| Specific Gravity at 60/60, °F | 0.897 | 0.942 | 0.929 |
| Aniline-Gravity Product, °F.°API | 4,970 | 1,082 | 1,352 |
| Watson Characterization Factor | 12.0 | 10.5 | 10.6 |

Although the very nature of this invention has necessitated a rather extensive theoretical discussion in order to fully understand its contribution over the prior art, it is to be understood that this invention has very practical applications and can be easily practiced by one skilled in the art. Thus, aside from all theoretical considerations, it has been discovered that if a particular hydrocarbon fraction desired to be hydrocracked has an aromatic content of at least 50% by volume and more preferably at least 60% it is preferred to use a crystalline aluminosilicate component having an alpha value of from 1.5 to 20,000, and more preferably from 1.5 to 10,000, and the hydrogenation-dehydrogenation component has an activity value from 5 to 35 and more preferably from 10 to 25. On the other hand, if a particular hydrocarbon fraction has an aromatic content less than 50%, and more preferably less than 40% by volume, it is preferred to use an aluminosilicate having an alpha value of from 1.5 to 30,000, and even more preferably from 1.5 to 10,000, together with a hydrogenation-dehydrogenation component which has an activity of at least 40 and more preferably between 60 to 100. It has been found that carrying out hydrocracking operations in accordance with the above-indicated balance of activities of the hydrogenation component and the cracking catalyst in relation to the chemical composition of the particular hydrocarbon feed, that the maximum amount of desired liquid products would be obtained.

As can be seen, the novel process of this invention enables the operator to maximize his liquid yield of desired products independent of the particular charge stream. One particular advantage of the novel process of this invention resides in the fact that the activity values above-described can be made to occur in situ in a reaction zone. Thus, for example, sulfur is a well known poison for platinum catalysts and destroys the activity thereof. Accordingly, in the heretofore practiced processes it was customary to remove sulfur impurities from a hydrocarbon charge stock prior to its being hydrocracked. However, in accordance with the novel process of this invention if, in fact, a predominant amount of sulfur was present in a charge stock, then a hydrogenation catalyst could be charged which had an activity in excess of the activity required for optimum results wherein the sulfur present in the charge stock would lower the activity in situ to the desired value. In like manner the same procedure could be used with a charge stock which contained an excessive amount of nitrogen compounds which are known poisons for activity of cracking bases and some hydrogenation components. In a situation of this type, a catalyst could be initially charged which had an activity in excess of that which was desired so that the nitrogen compounds in the feed could reduce the activity to the desired levels in situ.

Hydrocracking in accordance with the present process is generally carried out at a temperature ranging from about 400° F. up to about 950° F., preferably 550° F. to 850° F., the hydrogen pressure in such an operation is generally within a range of about 100 and about 3000 p.s.i.g. and preferably about 500 to about 2000 p.s.i.g. The liquid hourly space velocity, i.e, the liquid volume of hydrocarbon per hour per volume of catalyst, is between 0.1 and about 10. In general the molar ratio of hydrogen to hydrocarbon charge employed is between 2 and about 80 and preferably between 5 and about 50.

The proces of this invention may be carried out in any equipment suitable for catalytic operations. The process may be operated batchwise. It is preferable, however, and generally more feasible, to operate continuously. Accordingly, the process is adapted to operations using a fixed bed of catalyst. Also the process can be operated using a moving bed of catalyst wherein the hydrocarbon flow may be concurrent or countercurrent to the catalyst flow. A fluid type of operation may also be employed with the catalyst described herein. After hydrocracking the resulting products may suitably be separated from the remaining components by conventional means such as absorption, distillation, etc. Also the catalyst after use over an extended period of time may be regenerated in accordance with conventional procedures by removing carbonaceous deposits from the surface of the catalyst in suitable atmospheres, i.e. oxygen or hydrogen, under conditions of elevated temperatures.

The following examples will illustrate the best mode contemplated for carrying out this invention:

EXAMPLE 1

A crystalline sodium aluminosilicate, described and identified as 13X molecular sieve in U.S. Patent 2,882,244, was base-exchanged with a rare-earth chloride solution containing 5% by weight of rare-earth chloride $$(RE\ Cl_3 \cdot 6H_2O)$$

and 2% by weight of ammonium chloride to remove sodium ions from the aluminosilicate and replace them with rare-earth and ammonium ions. The exchange was performed as follows: A slurry (25.5 lbs.) of 78.9 weight percent of the sodium aluminosilicate in water was contacted with 74.5 lbs. of the rare earth chloride-ammonium chloride solution for 30 minutes at 180° F. The slurry was then filtered, the aluminosilicate product remaining as residue on the filter cake. Then 880 ml. per minute of rare earth-ammonium chloride solution were poured over the aluminosilicate, and thus through the filter, at 180° F. for 12 hours. The product was then washed free of chlorides with water at room temperature, oven dried at 250° F., pelleted and sized to 14–25 mesh, and calcined for 10 hours at 1000° F. The calcined product, which contained 0.21 weight percent sodium and 25.5 weight percent of rare-earth oxides, was then treated for 24 hours at 1200° F. with steam at 15 p.s.i.g.

The rare-earth aluminosilicate (225 cc.) was vacuum spray impregnated with an aqueous solution of ammonium molybdate [83 weight percent of $(NH_4)_6Mo_7O_{24} \cdot 4H_2O$ in water], and dried overnight at 230° F. The product was then impregnated with an aqueous solution of cobalt chloride $(CoCl_2 \cdot 6H_2O)$, oven dried overnight, and calcined for 3 hours at 1000° F. This calcined product was then sulfided with a 50/50 volume mixture of hydrogen sulfide and hydrogen, at a rate of 200 cubic centimeters per minute per 100 cubic centimeters of catalyst, for 5 hours at 800° F. The finished catalyst contained 3.0 grams of cobalt oxide (CoO), 9.4 grams of molybdenum oxide ($MoO_3$) and 3.6 grams of sulfur for each 100 grams of rare-earth aluminosilicate support; and surface area was 217 m.²/gm. It was designated catalyst "A".

EXAMPLE 2

This example will illustrate the hydrocracking of a predominantly aromatic feed stock under conditions such that the hydrogenation-dehydrogenation sites are rate controlling.

The cobalt-molybdena on rare-earth aluminosilicate catalyst "A" of Example 1 was used to hydrocrack recycle stock obtained from catalytic cracking of California straight run gas oil. The properties of this feed stock are listed below.

Specific gravity, 60° F./60° F. _____ 0.9415
ASTM distillation, ° F.:
  IBP _____ 432
  5 vol. percent overhead _____ 464
  10 vol. percent overhead_____ 475
  30 vol. percent overhead_____ 494
  50 vol. percent overhead_____ 508
  70 vol. percent overhead_____ 529
  90 vol. percent overhead_____ 579
  EP _____ 622
Aniline number, ° F. _____ 58.4
Pour point, ° F. _____ −15
Sulfur content, wt. percent _____ 0.94
Nitrogen content, wt. percent _____ 0.04
Oxygen content, wt. percent _____ 0.05
Type analysis:
  Paraffins, vol. percent _____ 13.0
  Naphthenes, vol. percent _____ 17.2
  Aromatics, vol. percent _____ 68.1
  Olefins, vol. percent _____ 1.8

Table 1 presents the results of 23 cycles of hydrocyclic hydrocracking of this stock at 750 p.s.i.g. The cycle was 24 hours on stream followed by 12 hours of hydrogen regeneration.

While on stream, liquid hourly space velocity was 1.0, and hydrogen charge rate was 900 s.c.f. per barrel of hydrocarbon feed. In each cycle, temperature started at 650° F. and was periodically raised to a final value of about 780° F. This gave approximately constant conversion while on stream of about 73 volume percent to products boiling below 390° F. The product distribution data in Table 1 are from material balances made over the full time on stream.

Hydrogen regenerations were with unchanged hydrogen flow at 1175° F.

EXAMPLE 3

This example will illustrate the hydrocracking of a predominantly aromatic feed stock under conditions such that hydrogenation-dehydrogenation activity is greater than in Example 2 (i.e., at 1500 p.s.i.g.) and thus less rate controlling.

A second portion of the cobalt-molybdena on rare-earth aluminosilicate catalyst of Example 1 was used to hydrocrack the same catalytic cracking cycle stock as that of Example 2. Table 2 presents the results of 6 cycles of hydrocyclic hydrocracking of this stock at 1500 p.s.i.g. followed by 26 cycles at 750 p.s.i.g. At 1500 p.s.i.g., on-stream time was 24 hours; at 750 p.s.i.g., on-stream time was 12 hours. Regeneration time was 12 hours in both cases.

Just as in Example 2, liquid hourly space velocity was 1.0 while on stream; hydrogen charge rate was 9000 s.c.f. per barrel of hydrocarbon feed while on stream, and was unchanged during regeneration; conversion was approximately 73 volume percent to products boiling below 390° F.; and the product distribution data of Table 2 are from material balances made over the full time on stream.

The first 18 hydrogen regenerations of Table 2 were at 1175° F., but then regeneration temperature was brought down to 1000° F. without, as the table shows, any apparent effect on catalyst activity or product distribution.

The data of Tables 1 and 2 are consolidated and shown in Table 3. It can be seen that when the dehydrogenation-hydrogenation activity was more severely limiting (750 p.s.i.g.) the maximum yield of economically valuable liquid products were obtained.

TABLE 1.—HYDROCYCLIC HYDROCRACKING OF CATALYTIC CRACKING CYCLE STOCK[1] AT 750 P.S.I.G. OVER SULFIDED COBALT OXIDE-MOLYBDENA ON RARE-EARTH ALUMINOSILICATE

[1.0 LHSV while on stream. 24 hours on stream. 12 hours off stream. 9,000 s.c.f. of $H_2$ chge./bbl.]

| Cycle No. | Final temp., °F.[3] | Conv. to <390° F. vol. percent[4] | Dry Gas. wt. percent | Total $C_4$, vol. percent | i-$C_4$, vol. percent | $C_5$, vol. percent | $C_6$ to 180° F. vol. percent | 180° F. to 390° F. Yield, vol. percent | 180° F. to 390° F. Oct. No. R+3 ml.[5] | $C_5$+. Yield. vol. percent | 10-RVP Gasoline Yield. vol. percent | 10-RVP Gasoline Oct. No. R+3 ml.[5] | Excess n-$C_4$, vol. percent | $H_2$ cons., s.c.f./bbl. |
|---|---|---|---|---|---|---|---|---|---|---|---|---|---|---|
| 1 | 780 | 69.7 | 3.6 | 12.1 | 7.3 | 9.8 | 14.1 | 53.8 | 97.6 | 108.0 | 86.8 | 98.2 | −4.7 | 2,175 |
| 2 | 780 | 71.6 | 4.9 | 13.9 | 9.5 | 9.1 | 15.9 | 51.3 | 96.6 | 104.7 | 85.4 | 97.5 | −4.7 | 2,225 |
| 3 | 785 | 75.4 | 4.5 | 15.9 | 10.7 | 12.1 | 11.8 | 56.5 | 97.7 | 105.0 | 89.5 | 98.4 | −3.8 | 2,495 |
| 4 | 785 | 76.8 | 5.4 | 18.9 | 12.9 | 13.5 | 10.6 | 53.2 | 97.0 | 100.5 | 85.6 | 98.0 | −2.9 | 2,445 |
| 5 | 775 | | | | | | | | | | | | | |
| 6 | 775 | 76.8 | 4.7 | 15.9 | 10.7 | 11.8 | 10.1 | 59.7 | 97.3 | 104.8 | 91.1 | 98.1 | −4.3 | 2,530 |
| 7 | 780 | 72.8 | 4.7 | 16.0 | 10.1 | 12.1 | 9.6 | 53.9 | 98.2 | 102.8 | 84.2 | 98.7 | −2.9 | 2,355 |
| 8 | 775 | 80.6 | 5.0 | 15.6 | 10.8 | 11.0 | 11.9 | 62.6 | 98.2 | 104.9 | 95.9 | 98.7 | −5.5 | 2,510 |
| 9 | 785 | 85.9 | 5.7 | 18.6 | 12.0 | 12.9 | 14.3 | 61.1 | 98.1 | 102.3 | 98.5 | 98.6 | −3.6 | 2,660 |
| 10 | 775 | 64.8 | 3.8 | 12.9 | 6.8 | 9.7 | 10.0 | 49.7 | 97.5 | 104.6 | 77.7 | 98.0 | −2.2 | 2,195 |
| 11 | 765 | 72.9 | 4.6 | 16.9 | 11.5 | 12.7 | 7.6 | 55.5 | 96.5 | 103.0 | 84.2 | 97.6 | −3.4 | 2,485 |
| 12 | 775 | 71.1 | 4.0 | 13.4 | 9.0 | 11.2 | 9.8 | 55.7 | 96.9 | 105.6 | 85.4 | 97.8 | −4.3 | 2,300 |
| 13 | 775 | 68.7 | 3.9 | 11.1 | 6.9 | 9.7 | 9.3 | 56.2 | 97.2 | 106.4 | 84.5 | 98.1 | −5.2 | 2,265 |
| 14 | 770 | 73.0 | 4.7 | 12.3 | 7.3 | 12.7 | 12.3 | 54.5 | 96.7 | 106.5 | 88.4 | 97.3 | −4.0 | 2,395 |
| 15 | 775 | 68.7 | 4.3 | 14.3 | 8.3 | 12.6 | 8.4 | 53.2 | 96.6 | 105.4 | 82.4 | 97.6 | 3.1 | 2,440 |
| 16 | 775 | 70.8 | 4.6 | 14.6 | 7.3 | 13.6 | 11.8 | 50.2 | 96.5 | 104.8 | 83.1 | 97.4 | −0.8 | 2,455 |
| 17 | 775 | 71.2 | 4.3 | 14.1 | 7.6 | 11.4 | 14.7 | 49.6 | 96.9 | 104.6 | 84.2 | 97.6 | −2.0 | 2,390 |
| 18 | 775 | 68.1 | 3.9 | 12.5 | 7.4 | 10.8 | 9.5 | 54.5 | 96.2 | 106.7 | 83.4 | 97.2 | −4.1 | 2,315 |
| 19 | 780 | 62.5 | 4.6 | 12.7 | 10.4 | 10.7 | 6.6 | 50.0 | 97.0 | 104.8 | 74.9 | 97.8 | −6.1 | 2,340 |
| 20 | 770 | 69.8 | 4.1 | 12.8 | 7.8 | 13.1 | 8.0 | 56.0 | 96.8 | 107.3 | 85.2 | 97.6 | −3.2 | 2,435 |
| 21 | 780 | 69.3 | 4.0 | 13.9 | 9.0 | 11.6 | 11.1 | 51.7 | 97.1 | 105.2 | 82.8 | 98.1 | −3.4 | 2,345 |
| 22 | 785 | 66.7 | 4.0 | 13.3 | 7.9 | 10.9 | 10.8 | 51.1 | 97.0 | 106.0 | 80.8 | 97.8 | −3.1 | 2,440 |
| 23 | 775 | 72.1 | 5.2 | 14.0 | 9.2 | 12.9 | 10.9 | 53.2 | 96.5 | 104.8 | 85.2 | 97.3 | −3.4 | 2,475 |

[1] From catalytic cracking of California Straight Run Gas oil (430° F.–620° F.).
[2] Material balance taken over full 24 hours on stream.
[3] At 24 hours on stream for 48° API liquid product (corresponding to about 73 percent conversion).
[4] Conversion=100 vol. percent of products boiling above 390° F.
[5] Octane Numbers by CFR F–1 Method +3 ml. TEL.

TABLE 2.—HYDROCYCLIC HYDROCRACKING OF CATALYTIC CRACKING CYCLE STOCK [1] OVER SULFIDED COBALT OXIDE-MOLYBDENA ON RARE-EARTH ALUMINOSILICATE

[1.0 LHSV while on stream. 12 hours off stream. 9,000 s.c.f. of $H_2$ chge./bbl.]

| Cycle No. | Final temp., °F.[3] | Conv. to <390° F. vol. percent[4] | Dry Gas. wt. percent | Total C$_4$ vol. percent | i-C$_4$ vol. percent | C$_5$ vol. percent | C$_6$ to 180° F. vol. percent | 180° F. to 390° F. | | C$_5$+ Yield, vol. percent | 10-RVP Gasoline | | Excess n-C$_4$, vol. percent | H$_2$ cons., s.c.f./bbl. |
|---|---|---|---|---|---|---|---|---|---|---|---|---|---|---|
| | | | | | | | | Yield, vol. percent | Oct. No. R+3 ml.[5] | | Yield, vol. percent | Oct. No. R+3 ml.[6] | | |
| 1 | [7] 740 | 88.3 | 8.7 | 27.7 | 17.5 | 18.7 | 18.3 | 47.8 | ......... | 96.5 | 91.0 | ......... | +3.0 | 3,090 |
| 2 | 730 | 54.5 | 2.5 | 9.9 | 6.4 | 9.1 | 9.7 | 44.6 | 95.2 | 108.9 | 70.1 | 96.4 | −3.9 | 2,270 |
| 3 | 765 | 66.2 | 7.9 | 25.9 | 15.6 | 16.2 | 11.0 | 33.2 | 96.4 | 94.3 | 64.2 | 97.7 | +5.0 | 3,050 |
| 4 | 750 | 77.1 | 5.4 | 16.3 | 9.5 | 12.6 | 18.7 | 51.1 | 97.6 | 105.3 | 91.8 | 97.8 | −2.4 | 2,790 |
| 5 | 745 | 75.0 | 4.7 | 15.4 | 10.2 | 12.1 | 9.4 | 59.8 | 97.0 | 106.3 | 89.9 | 97.8 | −3.4 | 2,790 |
| 6 | 740 | 76.5 | 5.4 | 18.2 | 11.2 | 15.8 | 13.8 | 50.8 | 97.0 | 103.9 | 87.4 | 97.5 | −0.5 | 2,790 |
| 7 | [7] 770 | 72.4 | 3.0 | 13.8 | 8.3 | 10.1 | 13.7 | 54.9 | 96.4 | 106.3 | 88.2 | 97.2 | −4.1 | 2,305 |
| 8 | 770 | 70.5 | 4.0 | 13.7 | 9.5 | 10.6 | 10.7 | 55.5 | 96.6 | 106.3 | 85.8 | 97.6 | −4.8 | 2,405 |
| 9 | 770 | 73.8 | 4.3 | 14.8 | 10.1 | 11.5 | 9.3 | 59.2 | 97.0 | 106.2 | 89.3 | 98.0 | −4.6 | 2,645 |
| 10 | 785 | 75.2 | 4.0 | 14.9 | 9.7 | 12.3 | 11.6 | 57.0 | 97.0 | 105.7 | 90.0 | 97.8 | −4.0 | 2,430 |
| 11 | 770 | 71.1 | 3.0 | 12.2 | 8.1 | 10.5 | 12.9 | 55.6 | 96.5 | 107.9 | 88.4 | 97.3 | −5.4 | 2,320 |
| 12 | 770 | 72.8 | 4.7 | 14.9 | 9.5 | 9.6 | 12.4 | 53.8 | 96.6 | 103.1 | 85.2 | 97.5 | −3.9 | 2,485 |
| 13 | 770 | 75.2 | 2.8 | 12.2 | 6.9 | 13.7 | 9.8 | 69.5 | 96.4 | 108.7 | 93.5 | 97.4 | −4.6 | 2,385 |
| 14 | 755 | 75.2 | 5.8 | 22.0 | 13.3 | 16.9 | 13.3 | 45.4 | 96.0 | 100.3 | 82.2 | 97.1 | +0.9 | 2,855 |
| 15 | 770 | 69.9 | 3.9 | 14.0 | 9.3 | 12.4 | 7.8 | 55.7 | 96.5 | 105.9 | 84.4 | 97.5 | −3.9 | 2,415 |
| 16 | ......... | 71.8 | 6.5 | 20.9 | 12.6 | 13.6 | 11.3 | 43.9 | 96.4 | 97.1 | 75.7 | 97.6 | +0.9 | 2,760 |
| 17 | 750 | 62.8 | 4.7 | 17.4 | 11.1 | 12.5 | 14.6 | 39.1 | 96.3 | 103.5 | 72.4 | 97.1 | +0.2 | 2,665 |
| 18 | 750 | 81.6 | 5.5 | 20.4 | 10.8 | 16.4 | 12.3 | 55.5 | 96.2 | 102.5 | 92.8 | 97.2 | −0.4 | 2,840 |
| 19 [8] | 760 | 82.1 | 5.5 | 18.2 | 11.5 | 14.5 | 14.0 | 59.1 | 96.4 | 105.4 | 96.7 | 97.5 | −3.1 | 2,920 |
| 20 | 760 | 74.6 | 4.3 | 17.5 | 11.0 | 14.3 | 12.5 | 52.4 | 95.7 | 104.6 | 87.0 | 97.0 | −2.1 | 2,580 |
| 21 | 760 | 73.8 | 4.2 | 14.0 | 7.6 | 12.3 | 16.1 | 52.8 | 96.3 | 107.4 | 90.1 | 97.2 | −2.5 | 2,570 |
| 22 | 765 | 68.4 | 3.3 | 12.7 | 7.1 | 13.1 | 9.2 | 54.3 | 96.5 | 108.3 | 85.0 | 97.4 | −2.8 | 2,395 |
| 23 | 760 | 69.3 | 4.0 | 12.8 | 7.5 | 12.0 | 12.5 | 52.5 | 96.9 | 107.7 | 85.4 | 97.7 | −3.2 | 2,430 |
| 24 | 740 | 78.4 | 4.8 | 17.0 | 9.8 | 14.5 | 14.2 | 55.9 | 97.0 | 106.3 | 93.3 | 97.9 | −2.9 | 2,765 |
| 25 | 775 | 79.7 | 3.8 | 15.7 | 7.0 | 14.6 | 14.6 | 59.7 | 96.9 | 109.2 | 98.6 | 97.4 | −3.8 | 2,600 |
| 26 | 755 | 71.7 | 5.1 | 18.2 | 11.1 | 14.8 | 8.6 | 51.2 | 97.0 | 103.0 | 82.2 | 97.8 | −0.4 | 2,675 |
| 27 | 765 | 72.4 | 4.6 | 14.1 | 9.5 | 11.6 | 9.4 | 58.4 | 97.1 | 107.0 | 88.3 | 98.0 | −4.3 | 2,595 |
| 28 | 780 | 65.3 | 2.9 | 11.1 | 5.9 | 11.1 | 8.9 | 53.4 | 97.1 | 108.2 | 82.0 | 97.5 | −3.4 | 2,200 |
| 29 | 775 | 72.2 | 3.9 | 13.4 | 7.9 | 12.6 | 8.2 | 57.6 | 97.2 | 106.2 | 87.6 | 98.1 | −3.9 | 2,375 |
| 30 | 770 | 66.7 | 4.4 | 11.3 | 7.5 | 8.4 | 13.3 | 51.1 | 95.9 | 106.1 | 86.8 | 96.8 | −4.6 | 2,350 |
| 31 | 775 | 70.7 | 4.9 | 12.1 | 6.9 | 11.3 | 13.6 | 52.5 | 97.1 | 106.7 | 85.5 | 97.6 | −3.0 | 2,470 |
| 32 | 760 | 71.7 | 4.2 | 13.8 | 7.9 | 13.3 | 11.1 | 53.9 | 97.0 | 106.7 | 86.6 | 97.6 | −2.5 | 2,445 |

[1] From catalytic cracking of California Straight Run Gas Oil (430° F.–620° F.).
[2] Material balance taken over full time on stream.
[3] With unchanged hydrogen flow at 1,175° F. for the first 18 cycles, but at 1,000° F. thereafter.
[4] At end of each on-stream period for 49° API liquid product at 1,500 p.s.i.g., but for 48° API at 750 p.s.i.g. (corresponding to about 73 percent conversion).
[5] Conversion=100 volume percent of products boiling above 390° F.
[6] Octane Numbers by CFR F-1 Method +3 ml. TEL.
[7] 1,500 p.s.i.g. and 24 hours on stream for cycles 1–6; 750 p.s.i.g. and 12 hours on stream thereafter.

TABLE 3.—EFFECT OF PRESSURE ON PERFORMANCE DURING HYDROCYCLIC HYDROCRACKING OF CATALYTIC CRACKING CYCLE STOCK [1] OVER SULFIDED COBALT OXIDE-MOLYBDENA ON RARE-EARTH ALUMINOSILICATE 1.0 LHSV while on stream
9,000 s.c.f. of $H_2$ chge./bbl.
73% conversion [2] to products below 390° F.

| Pressure, p.s.i.g. | 1,500 | 750 |
|---|---|---|
| No. of Cycles in Average | 6 | 48 |
| Average Results: [3] | | |
| Dry Gas, wt. percent | 5.8 | 4.4 |
| Total C$_4$, vol. percent | 18.9 | 14.8 |
| i-C$_4$, vol. percent | 11.7 | 9.2 |
| C$_5$, vol. percent | 14.1 | 12.3 |
| C$_6$ to 180° F., vol. percent | 13.5 | 11.5 |
| 180° F. to 390° F.: | | |
| Yield, vol. percent | 48.0 | 54.5 |
| Oct. No., R+3 ml. TEL | 96.6 | 96.8 |
| C$_5$ to 390° F. Gaso., Vol. percent | 75.5 | 78.3 |
| 10-RVP Gaso.: | | |
| Yield, vol. percent | 82.5 | 87.0 |
| Oct. No., R+3 ml. TEL | 97.4 | 97.7 |
| Excess n-C$_4$, vol. percent | −0.4 | −3.3 |
| C$_5$+ yield, vol. percent | 102.5 | 105.3 |
| H$_2$ Cons., s.c.f./bbl | 2,800 | 2,490 |

[1] From catalytic cracking of California Straight Run Gas Oil (430° F.–620° F.).
[2] Results adjusted to 73 percent conversion. Conversion=100 vol. percent of products boiling above 390° F.
[3] From Tables 1 and 2.

EXAMPLE 4

A rare-earth aluminosilicate (111.4 grams) prepared according to Example 1 was impregnated with 66 milliliters of aqueous ammonium tungstate solution (tungsten content, 0.158 gram per milliliter) adjusted to pH 6.5 with citric acid. The resulting product was dried for 16 hours at 230° F. The impregnation was repeated using 15.3 milliliters of the same solution. This product was dried for 16 hours at 230° F., and then calcined in 2 volume percent of oxygen in nitrogen for 24 hours at 1000° F. The calcined product was then impregnated with 43 milliliters of aqueous nickel nitrate solution (nickel content, 0.04 gram per milliliter) and the resulting product was calcined for 3 hours at 1000° F. This calcined product was then sulfided with a 50/50 volume mixture of hydrogen sulfide and hydrogen at a rate of 200 cubic centimeters per minute per 100 cubic centimeters of catalyst, for 5 hours at 800° F. The finished catalyst contained 3.9 grams of nickel, 9.3 grams of tungsten and 3.9 grams of sulfur for each 100 grams of rare-earth aluminosilicate support; and surface area was 285 m.$^2$/gm. It was designated catalyst "B."

This catalyst was used in hydrocyclic hydrocracking of the feed stock of Example 2 under the same conditions of operation as in Example 2. The averaged results of 2 cycles of hydrocyclic operation at 750 p.s.i.g. with this catalyst are compared in Table 4 with the averaged results over the cobalt-molybdenum catalyst at 750 p.s.i.g. (Table 3), the comparison being made at 73 volume percent conversion to products boiling below 390° F.

TABLE 4.—EFFECTS OF CATALYST HYDROGENATION COMPONENT ON PERFORMANCE DURING HYDROCYCLIC HYDROCRACKING OF CATALYTIC CRACKING CYCLE STOCK[1] OVER CATALYSTS SUPPORTED ON RARE-EARTH ALUMINOSILICATES 9,000 s.c.f. of $H_2$ chge./bbl.
1.0 LHSV while on stream
73% conversion[2] to products below 390° F.
750 p.s.i.g.
24 hours on stream
12 hours off stream

|  | Fresh catalyst,[3] weight percent | |
| --- | --- | --- |
|  | 3.0 CoO<br>9.4 MoO₃<br>3.6 S | 3.9 Ni<br>9.3 W<br>3.9 S |
| No. of cycles in average | 48 | 2 |
| Average results:[4] | | |
| Dry Gas, wt. percent | 4.4 | 3.9 |
| Total C₄, vol. percent | 14.8 | 17.0 |
| i-C₄, vol. percent | 9.2 | 10.4 |
| C₅, vol. percent | 12.3 | 13.6 |
| C₆ to 180° F., vol. percent | 11.5 | 9.5 |
| 180° F. to 390° F., vol. percent: | | |
| Yield, vol. percent | 54.5 | 54.7 |
| Oct. No., R+3 ml. TEL[5] | 96.8 | 95.0 |
| C₅ to 390° F. Gaso., vol. percent | 78.3 | 77.8 |
| 10-RVP Gaso: | | |
| Yield, vol. percent | 87.0 | 86.1 |
| Oct. No., R+3 ml. TEL[5] | 97.7 | 96.5 |
| Excess n-C₄, vol. percent | −3.3 | −2.7 |
| C₅+yield, vol. percent | 105.3 | 104.8 |
| H₂ Cons., s.c.f./bbl | 2,490 | 2,510 |

[1] From catalytic cracking of California Straight Run Gas Oil (430° F.–620° F.)
[2] Results adjusted to 73 percent conversion. Conversion=100-vol. percent of products boiling above 390° F.
[3] Component concentrations expressed as wt. percent added to 100 wt. percent of aluminosilicate support.
[4] Results for CoO/MoO₃/S catalyst from Table 3.
[5] Octane number by CFR F-1 Method +3 ml. TEL.

It is to be noted that nickel-tungsten-sulfide has a higher hydrogenation activity than cobalt-molybdena, under the same reaction conditions. Thus, it can be seen that more aromatics were hydrogenated as evidenced by the lower octane number of the gasoline produced.

Examples 5–9 illustrate the hydrocracking of predominantly non-aromatic feed stock under conditions such that catalyst cracking sites are rate-controlling. The cracking sites will be shown to be rate-controlling by the fact that catalyst activity was unaffected when components of widely differing hydrogenation activity (i.e., platinum, nickel-tungsten-sulfide, cobalt-molybdena-sulfide) were used in combination with the same rare-earth aluminosilicate support.

EXAMPLE 5

A nickel-tungsten-sulfide on rare-earth aluminosilicate was prepared according to Example 4 except that the rare-earth aluminosilicate was not steamed between calcining and impregnation with tungsten and nickel. The rare earth oxide content of the finished base was 23.5 weight percent, and the finished catalyst contained 3.7 grams of nickel, 9.4 grams of tungsten and 3.8 grams of sulfur for each 100 grams of rare-earth aluminosilicate support; and surface area was 376 m.²/gm. It was designated as catalyst "C." This catalyst was used to hydrocrack Mid-Continent heavy straight run gas oil having the properties listed below:

| | |
| --- | --- |
| Specific gravity, 60° F./60° F. | 0.8939 |
| Vacuum ASTM distillation, ° F.: | |
| IBP | 579 |
| 5 vol. percent overhead | 669 |
| 10 volume percent overhead | 682 |
| 30 volume percent overhead | 720 |
| 50 volume percent overhead | 772 |
| 70 volume percent overhead | 832 |
| 90 volume percent overhead | 918 |
| EP | 946 |
| Aniline number, ° F. | 187.8 |
| Pour point, ° F. | +90 |
| Sulfur content, wt. percent | 0.57 |
| Nitrogen content, wt. percent | 0.06 |
| Oxygen content, wt. percent | 0.77 |

Type analysis:

| | |
| --- | --- |
| Paraffins, vol. percent | 28 |
| Naphthenes, vol. percent | 34.7 |
| Aromatics, vol. percent | 37.3 |

Table 5 presents the results of five cycles of hydrocyclic hydrocracking of this stock at 2000 p.s.i.g. On-stream and off-stream periods varied as shown in the table.

While on stream, liquid hourly space velocity was 0.5, and hydrogen charge rate was 3000 s.c.f. per barrel of hydrocarbon feed. The temperature schedule was arranged to give approximately constant conversion while on stream of about 40 volume percent to products boiling below 390° F. The product distribution data in Table 4 are from 4-hour material balances made in the third day on stream, and are adjusted to 40 percent conversion to products boiling below 390° F.

Hydrogen regenerations were with unchanged hydrogen flow at 800° F. The catalyst was resulfided with 50/50 hydrogen sulfide and hydrogen (as described in connection with the preparation of the catalyst) after each hydrogen regeneration and before subsequent reuse in hydrocracking.

EXAMPLE 6

A crystalline sodium aluminosilicate, identified as 13X molecular sieve in U.S. 2,882,244, was converted to a rare earth aluminosilicate by the same procedure as that used in Example 5 except that ammonium chloride was not used in the base exchange step. This variation from the procedure of Example 5 was for conveinence and does not affect the conclusions to be drawn. The resulting rare earth aluminosilicate was pelleted and crushed to 14 to 25 mesh particles and then vacuum spray impregnated with an aqueous solution of sodium chloroplatinate. The solution contained 0.0876 gram of platinum per milliliter and 0.256 gram of sodium per gram of platinum and was made by mixing aqueous chloroplatinic acid with aqueous sodium hydroxide. The amount of this solution which was used corresponded to 2.5 grams of platinum per 100 grams of rare earth aluminosilicate support. The resulting material was wet-aged in a partially covered container for 16 hours at 230° F. It was then reduced at atmospheric pressure with flowing hydrogen for 2 hours at 450° F. and 2 more hours at 950° F. The final catalyst contained 2.0 weight percent platinum, 0.79 percent Cl, 1.0 percent Na, had a surface area of 420 m.²/gm., and was designated as catalyst "D."

The Mid-Continent heavy gas oil described in Example 5 was hydrocracked in the presence of the catalyst described above. The hydrocracking conditions were 2000 pounds per square inch pressure, a liquid hourly space velocity of 0.5 and a hydrogen charge rate of 3000 standard cubic feet per barrel of hydrocarbon charge, while on stream, and reaction temperatures to obtain approximately 40 volume percent conversion to products boiling below 390° F. The catalyst was subjected to 3 days of hydrocracking, followed by 2 days of regeneration with unchanged hydrogen flow at 800° F. in each of the six cycles of Table 6.

Comparison of Tables 5 and 6 shows that activity for cracking the Mid-Continent heavy gas oil was no greater when the rare-earth aluminosilicate was impregnated with platinum than when it was impregnated with nickel-tungsten-sulfide. This is in spite of the fact that the platinum catalyst had a relative dehydrogenation activity (relative DA) of over 50 initially and of 7 finally, whereas that of the nickel-tungsten-sulfide is expected to have been too low to measure throughout the test (see hereinbefore cited reference of Myers, Garwood, Rope, Wadlinger and Hawthorne). In fact, the platinum catalyst was slightly less active than the nickel-tungsten-sulfide catalyst, and this probably reflects a somewhat higher sodium content (1.0 weight precent) in its aluminosilicate base than the 0.2–0.5 weight percent expected—but not actually determined—in the base of the nickeltungsten-sulfide catalyst. Thus, it is clear that catalyst activity in these two examples was not controlled by the hydrogenation-dehydrogenation component, but by the cracking component of the catalysts. This allowed utilizing the full activity of the rare-earth aluminosilicate cracking component to achieve high conversion at relatively low temperatures; and thus to achieve the *same* high selectivity for gasoline production at this mild temperature condition over both catalysts.

EXAMPLE 7

Nickel-tungsten-sulfide and platinum on substantially the same rare-earth aluminosilicate cracking base were compared for cracking predominantly non-aromatic stocks under conditions making the cracking sites rate-controlling in Examples 5 and 6. A cobalt-molybdenum sulfide catalyst and a platinum catalyst are compared in the same way in Examples 7 and 8.

A catalyst comprising platinum deposited on a dispersion of 25 weight percent of rare-earth aluminosilicate in a porous silica-alumina matrix was prepared in the following manner:

A solution, hereinafter called the silicate solution, of 42.6 weight percent sodium silicate, 53.1 weight percent water and 4.3 weight percent sodium aluminosilicate (as described in U.S. Patent 2,882,244) was prepared. A separate solution, hereinafter called the acid solution, composed of 93.2 weight percent water, 3.43 weight percent aluminum sulfate $[Al_2(SO_4)_3]$ and 3.23 weight percent concentrated sulfuric acid was prepared. The above-described solutions were mixed together through a nozzle using 398 cubic centimeters per minute of silicate solution at 58° F. and 320 cubic centimeters per minute acid solution at 40° F. The resulting hydrosol, containing 25 weight percent dispersed sodium aluminosilicate particles (on a finished catalyst basis) had a gel time of 1.7 seconds at 630° F. and a pH of 8.5.

Hydrogel beads of the above gel were prepared and placed in a solution containing 2 weight percent rare earth chloride and 2 weight percent ammonium chloride immediately after forming. The hydrogel was contacted with this base-exchange solution nine times for 2-hour periods and three times overnight at room temperature. The base-exchange hydrogel was then washed continuously with water until the effluent water was substantially free of chloride ion. The washed hydrogel was then dried in air at 270° F. for 20 hours, calcined at 1000° F. in air for 10 hours and sized to 14 to 25 mesh particles. The final product contained 10.8 weight percent rare earth oxides.

The above product (46.3 grams) was impregnated with 30 cubic centimeters of an aqueous solution of chloroplatinic acid (0.0879 gram platinum per cubic centimeter). The impregnated material was wet-aged at 230° F. for 16 hours, reduced with hydrogen at 450° F. for 2 hours, and finally at 900° F. for 2 hours. The platinum content of the finished catalyst was 0.7 weight percent, and the surface area was 413 m.²/gm. This catalyst was designated "E."

The Mid-Continent heavy gas oil described in Example 5 was hydrocracked in the presence of the above-described catalyst under similar hydrocracking conditions as used in Example 5. The hydrocracking periods were 6, 3, 3, 3 and 3 days. Regenerations after each of the aforementioned periods of time were conducted using hydrogen to remove the accumulated coke. The hydrocracking data are described in detail in Table 7.

EXAMPLE 8

The rare-earth aluminosilicate in a porous silica-alumina cracking base of the catalyst of this example was prepared in a manner similar to that of Example 7 except that the base-exchange solution contained no ammonium chloride. The rare earth oxide content of the finished base was 14.9 weight percent, and the sodium content was 0.44 weight percent. This cracking component was then impregnated with cobalt and molybdena and sulfided in the manner used in Example 1. Before sulfiding the final catalyst contained 3.1 grams of cobalt oxide (CoO) and 8.8 grams of molybdenum oxide $(MoO_3)$ for each 100 grams of rare-earth aluminosilicate plus silica-alumina matrix; and had surface area of 345 m.²/gm. The catalyst was designated "F."

The Mid-Continent heavy gas oil used in Examples 5–7 was hydrocracked in the presence of the above-described catalyst for six days under the conditions of cycle No. 1 of Example 7. Results from this experiment, calculated in the same way as those of Tables 5–7 are listed below.

Temperature at 48 hours for 47° API liquid product _____ 745
Product distribution at 40 vol. percent conversion:
    Dry gas, wt. percent _____ 2.1
    $C_4$, vol. percent _____ 9.4
    $C_5$, vol. percent _____ 8.0
    $C_6$ to 170° F., vol. percent _____ 6.2
    170° F. to 390° F., vol. percent _____ 31.3
    $C_5+$ yield, vol. percent _____ 105.5
    $H_2$ cons., s.c.f./bbl. _____ 1080
    $C_5$ to 390° F. gaso., vol. percent _____ 45.5

Comparison of Examples 7 and 8 leads to the same conclusions as comparison of Examples 5 and 6. The catalyst activity was not controlled by hydrogenation-dehydrogenation activity in either comparison. That is, catalyst activity was the same whether high hydrogenation activity (i.e., platinum) or low hydrogenation activity (i.e., cobalt-molybdenum sulfides, nickel-tungsten-sulfide) components were used. Since hydrogenation-dehydrogenation activity was not rate-controlling in either comparison, cracking activity was; and the use of high activity, unsteamed rare-earth aluminosilicate cracking components allowed attaining high conversion at the low temperatures most favorable to high selectivity. In each comparison, catalyst activity and selectivity are the same when the cracking component is the same reflecting that the cracking component was the controlling ingredient of the catalysts being compared, and that the differences in the hydrogenation-dehydrogenation components of the catalysts were not the controlling factors in the experiments.

EXAMPLE 9

This example is to illustrate the difficulty of making very high octane number gasolines by hydrocracking predominantly non-aromatic feed stocks.

A nickel-tungsten-sulfide on rare-earth aluminosilicate catalyst was prepared by the procedures of Example 4 except that impregnation with nickel and tungsten was carried farther until the final catalyst contained 7.6 grams of nickel, 17.9 grams of tungsten, and 6.3 grams of sulfur for each 100 grams of rare-earth aluminosilicate support. Final sodium content was 0.21 weight percent, and surface area was 220 m.²/gm. This catalyst was designated "G."

The Mid-Continent heavy gas oil used in Example 5–8 was hydrocracked over the above-described catalyst. Table 8 presents details and the results of 20 cycles of hydrocyclic hydrocracking, the first 3 cycles being at 1000 p.s.i.g. and the last 17 being at 500 p.s.i.g. Conditions other than pressure were our standard conditions for this stock (0.5 LHSV while on stream, 3000 s.c.f. of hydrogen charge/bbl., 40 percent conversion to gasoline and lighter products) just as in Examples 5–8.

Pressure was reduced from 2000 p.s.i.g. in Examples 5–8 to 500 p.s.i.g. in Example 9 and other significant thermodynamic factors were materially unchanged. This favors production of aromatics. Yet Table 8 shows that the heavy naphtha (170° F. to 390° F.) produced at 500 p.s.i.g. had only an octane number of 73.7 (research method F-1, using 3 ml. TEL). This indicates that the heavy naphtha produced, even at low pressure from this predominantly non-aromatic feed stock, was probably low in aromatic content compared with the 95–98 octane number heavy naphthas made from the predominantly aromatic feed stocks of Examples 2–4. Indeed, the highest octane number (leaded) heavy naphtha that we have produced from this feed stock by hydrocracking under any circumstances was 81; this was with a less active catalyst at 100° F. higher reaction temperatures.

TABLE 5.—HYDROCYCLIC HYDROCRACKING OF STRAIGHT RUN GAS OIL [1] AT 2,000 P.S.I.G. OVER NICKEL-TUNGSTEN-SULFIDE ON RARE-EARTH ALUMINOSILICATE

[40% Conversion [2] to products below 390° F. 0.5 LHSV while on stream. 3,000 s.c.f. of $H_2$ chge./bbl.]

| Cycle No. | Hydrocracking Step [3] | | | | | | | | | Regeneration time,[4] days |
|---|---|---|---|---|---|---|---|---|---|---|
| | On-stream time, days | Temp.[5] at 48 hrs. on stream, °F. | Dry Gas, wt. percent | $C_4$, vol. percent | $C_5$, vol. percent | $C_6$ to 170° F., vol. percent | 170° F. to 390° F., vol. percent | $C_5$+ yield, vol. percent | $H_2$ cons., s.c.f./ bbl. | $C_5$ to 390° F. gasoline, vol. percent | |
| 1 | 6 | 705 | 1.6 | 7.7 | 6.3 | 5.4 | 34.9 | 106.6 | 1,125 | 46.6 | 2 |
| 2 | 3 | 705 | 1.5 | 6.8 | 5.1 | 6.2 | 35.8 | 107.1 | 1,100 | 47.1 | 1 |
| 3 | 3 | 710 | 1.4 | 6.6 | 6.0 | 5.9 | 35.0 | 106.9 | 1,075 | 46.9 | 2 |
| 4 | 3 | 700 | 1.3 | 5.1 | 5.8 | 5.8 | 37.2 | 108.8 | 985 | 48.8 | 2 |
| 5 | 3 | 705 | 1.4 | 8.4 | 7.6 | 7.5 | 33.2 | 108.3 | 1,015 | 48.3 | 1 |

[1] Mid-Continent Heavy Gas Oil (650° F.–950° F.).
[2] Results adjusted to 40% conversion. Conversion=100 vol. percent of products boiling above 390° F.
[3] Product distributions from 4-hr. material balances taken in third day on stream.
[4] At 800° F. with unchanged hydrogen flow.
[5] At 48 hours on stream for 47 °API liquid product (corresponds to about 40% conversion).

TABLE 6.—HYDROCYCLIC HYDROCRACKING OF STRAIGHT RUN GAS OIL [1] AT 2,000 P.S.I.G. OVER 2% PLATINUM ON RARE-EARTH ALUMINOSILICATE

[3,000 s.c.f. of $H_2$ chge./bbl. 40%[2] conversion to products below 390° F. 0.5 LHSV while on stream. 3 days on stream, 2 days off stream]

| Cycle No. | Hydrocracking Step [3] | | | | | | | | | Relative DA [5] after $H_2$ regeneration [6] |
|---|---|---|---|---|---|---|---|---|---|---|
| | Temp.[4] at 48 hrs. on stream, °F. | Dry gas, wt. percent | $C_4$, vol. percent | $C_5$, vol. percent | $C_6$ to 170° F., vol. | 170° F. to 390° F. vol. percent | $C_5$+ yield, vol. percent | $H_2$ cons., s.c.f./ bbl. | $C_5$ to 390° F. gasoline, vol. percent | |
| 1 | 725 | 1.6 | 7.9 | 7.0 | 6.3 | 34.5 | 107.8 | 1,255 | 47.8 | -- |
| 2 | 725 | 1.6 | 9.0 | 5.1 | 5.5 | 36.5 | 107.1 | 1,330 | 47.1 | 47 |
| 3 | 725 | 2.2 | 7.9 | 7.6 | 3.8 | 33.7 | 105.1 | 1,190 | 45.1 | 32 |
| 4 | 715 | 1.6 | 6.0 | 5.3 | 2.5 | 39.9 | 107.7 | 1,225 | 47.7 | 13 |
| 5 | 715 | 2.0 | 7.2 | 6.9 | 5.5 | 33.4 | 105.8 | 945 | 45.8 | -- |
| 6 | 715 | 1.5 | 6.9 | 5.6 | 7.4 | 35.0 | 108.0 | 1,035 | 48.0 | 7 |

[1] Mid-Continent Heavy Gas Oil (650° F.–950° F.).
[2] Results adjusted to 40% conversion. Conversion=100 vol. percent of products boiling above 390° F.
[3] Product distributions from 4-hr. material balances taken in third day on stream.
[4] At 48 hours on stream for 47° API product gravity (corresponds to about 40% conversion).
[5] Relative DA is yield of benzene from cyclohexane dehydrogenation relative to that of RD-150.6 platinum reforming catalyst. See Myers et al., Journ. Chem. Eng. Data 7, 257 (1962).
[6] At 800° F. with unchanged hydrogen flow.

TABLE 7.—HYDROCYCLIC HYDROCRACKING OF STRAIGHT RUN GAS OIL [1] AT 2,000 P.S.I.G. OVER PLATINUM ON BEAD-FORM [2] RARE-EARTH ALUMINOSILICATE

[40% Conversion [3] to products below 390° F. 0.5 LHSV while on stream. 3,000 s.c.f. of $H_2$ chge./bbl.]

| Cycle No. | Hydrocracking Step [4] | | | | | | | | | Regeneration time,[6] days |
|---|---|---|---|---|---|---|---|---|---|---|
| | On-stream time, days | Temp.[5] at 48 hrs. on stream, °F. | Dry Gas, wt. percent | $C_4$, vol. percent | $C_5$, vol. percent | $C_6$ to 170° F., vol. percent | 170° F. to 390° F., vol. percent | $C_5$+ yield, vol. percent | $H_2$ cons., s.c.f./ bbl. | $C_5$ to 390° F. gasoline, vol. percent | |
| 1 | 6 | 730 | 1.9 | 9.1 | 5.4 | 7.9 | 32.4 | 105.7 | 1,100 | 45.7 | 2 |
| 2 | 3 | 745 | 1.9 | 7.8 | 6.8 | 8.4 | 32.0 | 107.2 | 1,135 | 47.2 | 2 |
| 3 | 3 | 740 | 1.9 | 8.4 | 7.6 | 5.8 | 32.0 | 105.4 | 1,020 | 45.4 | 2 |
| 4 | 3 | 740 | 1.4 | 4.8 | 4.0 | 6.1 | 38.5 | 108.6 | 1,070 | 48.6 | 2 |
| 5 | 3 | 750 | 2.0 | 8.0 | 6.7 | 5.8 | 33.8 | 106.3 | 1,065 | 46.3 | 2 |

[1] Mid-Continent Heavy Gas Oil (650° F.–950° F.).
[2] Platinum support is a dispersion of 25% 13X sodium aluminosilicate in 94/6 $SiO_2/Al_2O_3$ after exchange with rare-earth and ammonium chlorides.
[3] Results adjusted to 40% conversion. Conversion=100 vol. percent of products boiling above 390° F.
[4] Product distributions from 4-hr. material balances taken in third day on stream.
[5] At 48 hours on stream for 47 °API liquid product (corresponds to about 40% conversion).
[6] At 800° F. with unchanged hydrogen flow.

TABLE 8.—HYDROCYCLIC HYDROCRACKING OF STRAIGHT RUN GAS OIL AT 500 P.S.I.G. OVER DOUBLE CONCENTRATION OF NICKEL-TUNGSTEN SULFIDE ON RARE-EARTH ALUMINOSILICATE 0.5 LHSV while on stream. Mid-Continent 650° F.+Gas Oil. 24 hours on stream. 12 hours off stream. 3,000 s.c.f. of $H_2$ chge./bbl. 40 Vol. percent conv. to products below 390° F.[1]

| Cycle No. | Press. p.s.i.g. | Hydrocracking performance, full time on stream [4] | | | | | | | | Regeneration temp., °F.[2] |
|---|---|---|---|---|---|---|---|---|---|---|
| | | Activity, °F. at 24 hrs.[3] | Dry Gas, wt. percent | $C_4$, vol. percent | $C_5$, vol. percent | $C_6$ to 170° F., vol. percent | 170° to 390° F., vol. percent | $C_5$+ yield, vol. percent | $H_2$, cons., s.c.f./ bbl. | |
| 1–3 | 1,000 | 675 | 0.8 | 5.2 | 8.1 | 6.6 | 36.5 | 111.1 | 1,080 | 900 |
| 4–6 | 500 | 705 | 1.5 | 5.6 | 5.3 | 6.1 | 33.8 | 105.2 | 995 | 1,175 |
| 7–9 [5] | 500 | 710 | 1.4 | 4.9 | 4.6 | 5.7 | 36.4 | 106.7 | 970 | 1,175 |
| 10–12 | 500 | 690 | 1.1 | 4.4 | 4.4 | 5.2 | 37.5 | 107.1 | 930 | 1,175 |
| 13–15 [6] | 500 | 705 | 1.4 | 4.9 | 4.9 | 5.8 | 35.4 | 106.1 | 1,000 | 1,175 |
| 16–18 | 500 | 705 | 1.3 | 5.0 | 4.9 | 4.6 | 36.3 | 105.8 | 860 | 1,175 |
| 19–20 [6] | 500 | 705 | 1.3 | 4.9 | 5.4 | 5.2 | 34.6 | 105.2 | 660 | 1,175 |

[1] Results adjusted to 40% conversion. Conversion=100-vol. percent of products boiling above 390° F.
[2] With unchanged $H_2$ flow.
[3] For 43°API product gravity at 500 p.s.i.g., but 44°API at 1,000 p.s.i.g. (corresponds to about 40% conversion).
[4] Averaged results from each 3 successive cycles.
[5] Octane No. of heavy naphtha from cycle No. 7 was 73.7 (F-1 +3 ml. TEL).
[6] No material balances during cycles 14 and 19.

GLOSSARY

13X: Sodium form of synthetic faujasite X; disclosed in U.S. 2,882,244.
5A: Calcium form of A; disclosed in U.S. 2,882,243.
4A: Sodium form of A; disclosed in U.S. 2,882,243.
Y: Form of synthetic faujasite; disclosed in Belgian Patent 617,598.
Specific cation and/or the term "acid" preceding a zeolite: Designates replacing at least part of cations originally associated with the zeolite with other metal cations and/or hydrogen ions or precursors thereof.
Octane number: Determined according to the following procedure: ASTM Method D–908, popularly referred to as Research Octane Number (+3 cc. TEL).
The rare earth chloride solution used in examples has the following compositions:

| | Weight percent |
|---|---|
| Cerium (as $CeO_2$) | 48 |
| Lanthanum (as $La_2O_3$) | 24 |
| Praseodymium (as $Pr_6O_{11}$) | 5 |
| Neodymium (as $Nd_2O_3$) | 17 |
| Samarium (as $Sm_2O_3$) | 3 |
| Gadolinium (as $Gd_2O_3$) | 2 |
| Other rare earth oxides | 0.8 |

What is claimed is:
1. A process for hydrocracking a hydrocarbon charge having an aromatic content of at least 50 percent which comprises contacting the same under hydrocracking conditions with a catalyst composition comprising a hydrogenation component having an activity of from 5 to 35 and a crystalline aluminosilicate having an alpha value of from 1.5 to 20,000.
2. The process of claim 1 wherein the charge has an aromatic content of at least 60 percent.
3. The process of claim 1 wherein the hydrogenation activity ranges from 10 to 25.
4. A process for hydrocracking a hydrocarbon charge having an aromatic content of less than 50 percent which comprises contacting the same under hydrocracking conditions with a catalyst composition comprising a hydrogenation component having an activity of at least 40 and a crystalline aluminosilicate having an alpha value of from 1.5 to 20,000.
5. The process of claim 4 wherein the feed has an aromatic content of less than 40 percent.
6. The process of claim 4 wherein the hydrogenation activity ranges from 60 to 100.

References Cited

UNITED STATES PATENTS 3,140,253   7/1964   Plank et al. _____ 208—120

OTHER REFERENCES

"Advantages in Hycrocracking," Voorhies et al., pages 172 to 176, chapter 3, vol. VIII, in Advances in Petroleum Chem. and Refining, Interscience Publishers, New York, 1964.

ABRAHAM RIMENS, *Primary Examiner.*

DELBERT E. GANTZ, *Examiner.*

UNITED STATES PATENT OFFICE
CERTIFICATE OF CORRECTION

Patent No. 3,384,572                                           May 21, 1968

Claude Myers et al.

It is certified that error appears in the above identified patent and that said Letters Patent are hereby corrected as shown below:

Column 14, line 2, "900" should read -- 9000 --. Columns 13 and 14, TABLE 1, under the heading "Excess n-$C_4$, vol. percent", line 15 thereof, "3.1" should read -- -3.1 --. Columns 15 and 16, TABLE 2, in the heading to the second column, "° F.[3]" should read -- ° F.[4] --; same TABLE 2, in the heading to the third column, "percent[4]" should read -- percent[5] --; same TABLE 2, in the heading to the tenth column, "R+3 ml.[5]" should read -- R+3 ml.[6] --; same TABLE 2, under the heading "Yield, vol. percent," line 13 thereof, "69.5" should read -- 60.5 --. Columns 21 and 22, TABLE 6, the heading entitled "$C_6$ to 170° F.,F., vol." should read -- $C_6$ to 170° F., vol. % --.

Signed and sealed this 25th day of November 1969.

(SEAL)
Attest:

EDWARD M.FLETCHER, JR.                            WILLIAM E. SCHUYLER, JR.
Attesting Officer                                                Commissioner of Patents